Feb. 17, 1948.    M. J. MANJOINE    2,436,317
TESTING APPARATUS FOR DETERMING THE MECHANICAL
BEHAVIOR OF METALS UNDER TEST
Filed May 23, 1944    3 Sheets-Sheet 1
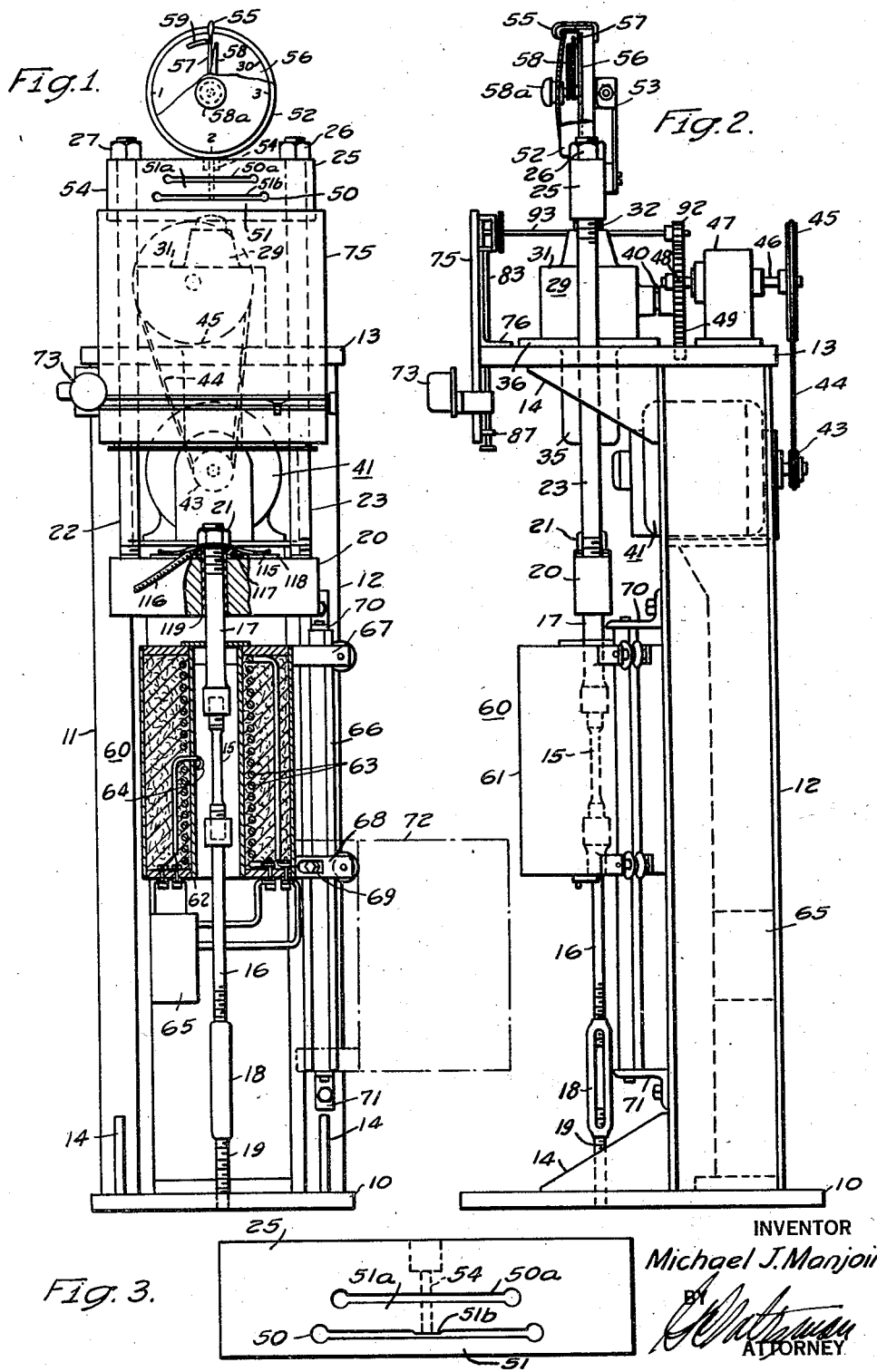
INVENTOR
Michael J. Manjoine.
ATTORNEY Feb. 17, 1948.  M. J. MANJOINE  2,436,317
TESTING APPARATUS FOR DETERMING THE MECHANICAL
BEHAVIOR OF METALS UNDER TEST
Filed May 23, 1944  3 Sheets-Sheet 2

WITNESSES:
E. G. McCloskey.
Birney Hines

INVENTOR
Michael J. Manjoine.
ATTORNEY

Feb. 17, 1948.  M. J. MANJOINE  2,436,317
TESTING APPARATUS FOR DETERMING THE MECHANICAL
BEHAVIOR OF METALS UNDER TEST
Filed May 23, 1944   3 Sheets-Sheet 3

WITNESSES:
E. A. M'Closkey
Birney Hines

INVENTOR
Michael J. Manjoine.
BY
ATTORNEY

Patented Feb. 17, 1948

2,436,317

UNITED STATES PATENT OFFICE 2,436,317

TESTING APPARATUS FOR DETERMINING THE MECHANICAL BEHAVIOR OF METALS UNDER TEST

Michael J. Manjoine, Pittsburgh, Pa., assignor to Westinghouse Electric Corporation, East Pittsburgh, Pa., a corporation of Pennsylvania Application May 23, 1944, Serial No. 536,947

10 Claims. (Cl. 73—15.6)

My invention relates to metal testing machines and, more particularly, to machines of this character for determining the mechanical behavior of a metal or metal alloy at a given stress and at a given high temperature, including the creep or plastic extension and fracture as a result of the stress and the high temperature.

The increased use of metal alloys under high temperatures during the last few years has rendered it desirable to understand more definitely the effects of heat treatments on such metal alloys, and how they will react under long service in high temperatures. One method of securing this information is to make use of data from creep-time curves carried to rupture, the curves being prepared from data obtained by holding the test specimen at a constant load in a constant temperature and noting the extension of the specimen until it becomes ruptured. The loads for these tests are chosen to cause rupture of the specimens after different periods which may vary from a few hours to several thousand hours, and it is desirable to have as near as possible a continuous record of elongation of the specimen due to creep with time. If short tests are used, lasting from a few hours to several hundred hours, it is difficult to obtain sufficient readings to draw a complete curve to rupture. If long tests extending as long as 1,000 or more hours are used, it is difficult and expensive to give such tests the necessary attention to insure a sufficient number of readings over the length of time necessary for the test.

Therefore, one object of my invention is to provide a testing machine which will, after being loaded with a test specimen and started, make a complete test of the specimen, automatically produce a creep-time-to-rupture curve for the specimen and then stop the operation of the machine.

A further object of the invention is to provide a test apparatus having no extensometer on the specimen in the furnace and no parts protruding from the furnace except the specimen grips.

A still further object is to provide a testing apparatus which shall be simple and inexpensive in construction and operation and which will occupy a very small floor space.

It is also an object to provide a testing apparatus which will operate a pen over a curve sheet during a test and which will continue to register on a separate device the amount of the creep of the test specimen until it ruptures, even though the recording pen may leave the curve sheet upon which it is operating, so that such registered record may be used for completing the creep-time curve.

Although my improved machine is designed particularly for producing creep-time-to-rupture curves, it is also useful for (a) sorting metal alloys, (b) checking heat treatments of metal alloys, (c) making quality tests for checking several melts of a metal alloy, (d) making rupture tests on a particular metal alloy, and (e) running constant strain-rate tests, short-time tensile tests, or relaxation tests.

For a better understanding of the invention, reference may be had to the accompanying drawings in which:

Figure 1 is a view in front elevation of a testing apparatus embodying my invention;

Fig. 2 is a view in side elevation of the testing apparatus illustrated in Fig. 1;

Fig. 3 is an enlarged view in front elevation of the force measuring bar included in the apparatus;

Figure 4:
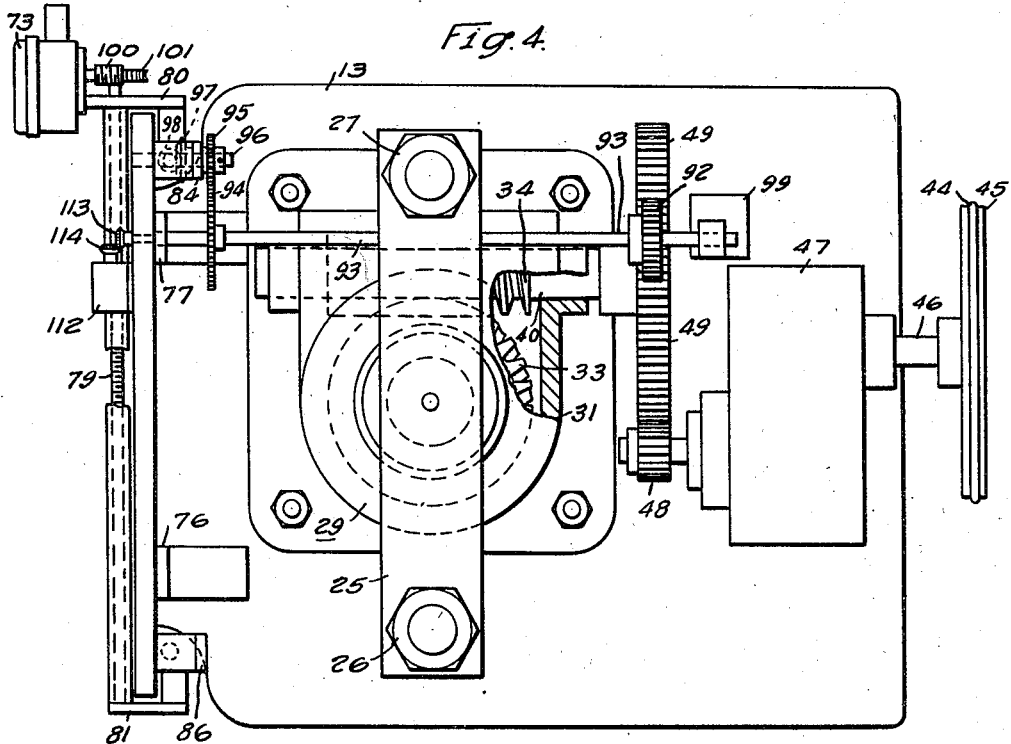
Fig. 4 is an enlarged top plan view of the testing apparatus illustrated in Figs. 1 and 2.
Figure 5:
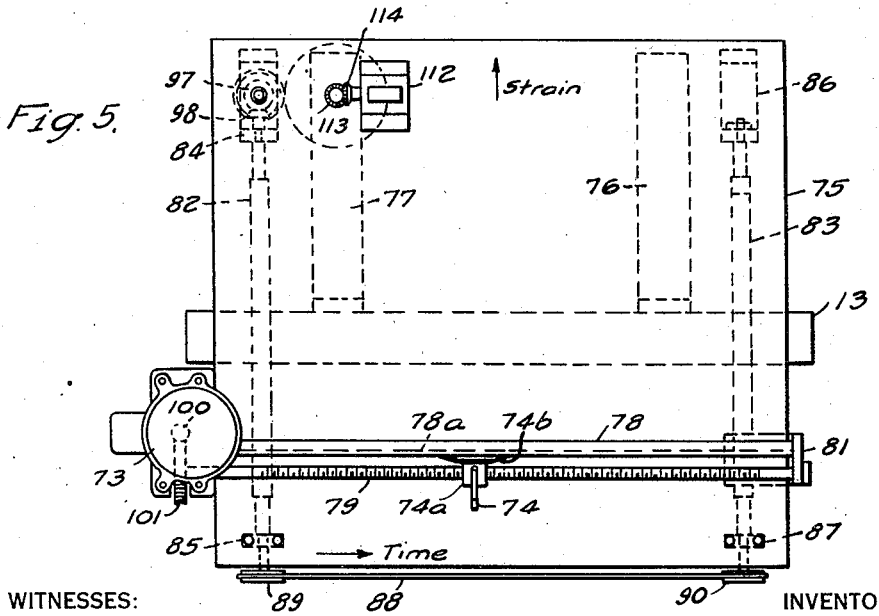
Fig. 5 is an enlarged view in front elevation of the curve sheet board and a marking device mounted on the upper front portion of the testing machine illustrated in Figs. 1 and 2.

Referring more particularly to the drawings, I have illustrated a testing machine having an upright rectangular-like frame comprising a base plate 10, a pair of channel irons 11 and 12 vertically disposed on the base plate and securely sealed thereto, and a top plate 13 securely welded to the upper ends of the channel irons. A plurality of gussets 14 are welded to the corners of the frame to give it additional strength. The parts of the frame should be made of very heavy material with reference to the range of dimensions of the test specimens to be tested so that there will be very little distortion and the results of the tests will be accurate.

The means for mounting a test specimen such as is indicated by the bar 15 in the machine when it is desired to make a test comprises an anchor such as a lower specimen grip 16 and a pulling upper specimen grip 17. The top of the anchor grip 16 has a suitable screw-threaded recess into which the lower end of the test specimen may be screwed and its lower end is screw threaded so that it may screw into the upper end of a turnbuckle 18, the lower end of which is screwed on a shaft 19 which is firmly screwed into the bottom plate 10. The grip 16, the turnbuckle 18 and the shaft 19 thus provide a suitable means for anchoring the lower end of the specimen 15 to the bed-plate of the testing machine.

The loading grip 17 is provided with a screw-threaded recess in its lower end into which the upper end of the test specimen 15 may be screwed securely so that its slender central test portion may be placed under any desired strain. The upper end of the loading grip extends upwardly through a cross bar 20 and a nut 21 is screwed on it to hold it firmly in position. The cross bar is secured to the lower ends of a pair of vertical rods 22 and 23 which are vertically and slidably disposed in the top plate 13 of the machine. A force measuring bar 25 is mounted on the upper ends of the rods 22 and 23 by means of suitable nuts 26 and 27, so that the cross bar 20, the rods 22 and 23 and the measuring bar 25 provide an auxiliary frame or loading means for applying a stretching load to the test specimen.

A loading jack 29 is mounted on the top plate 13 in position to engage a socket in the underside of the measuring bar 25 and thereby provide a means whereby an upward force may be applied to the measuring bar to raise the rods 22 and 23, the cross bar 20 and the grip 17 and thus apply a testing load to the specimen 15.

The loading jack 29 comprises a cast frame or housing 31, a screw-threaded jack shaft 32, a worm wheel 33, and a worm 34. The housing 31 is provided with a depending portion 35 and a centrally located flange 36 by means of which it may be seated and supported in a centrally located hole in the top plate 13. The screw-threaded jack shaft 32 is disposed in a vertical hole in the central portion of the housing and is provided with a slot 37 disposed to be engaged by a key which permits it to slide up and down in the housing but prevents it from rotating. The worm wheel is mounted in horizontal position in the center of the housing and is provided with an inwardly facing screw thread which meshes with the screw thread on the jack shaft so that rotation of the worm wheel in one direction will raise the jack shaft and in another direction will lower the jack shaft.

The worm 34 for operating the jack shaft is mounted on a suitable shaft 40 arranged to be driven by a motive means such as a small alternating current electric motor 41. The motor is mounted in a suitable position between the channel sides 11 and 12 and is operatively connected to the worm shaft 40 through a main gear mechanism comprising a pulley 43, a belt 44, a pulley 45, a shaft 46, a suitable gear reducing means 47, a pinion 48 and a gear wheel 49.

In order that the force applied by the jack to the test specimen may be measured, the measuring bar is constructed out of a block of alloy steel by making a saw cut or slot 50 in its lower central portion to convert the lower section of the bar against which the jack rests into a resilient segment or spring bar 51. The spring bar will bend upwardly in accordance with the upward force exerted upon it by the jack. When the test specimen elongates during test, it reduces the downward pull of the rods 22 and 23 on the ends of the measuring bar and thus permits the ends of the measuring bar to move upwardly, thereby permitting the resilient segment 51 to return toward its normally straight condition and thus decreasing the load on the specimen.

A pressure indicating instrument 52 is mounted on the measuring bar by a bracket 53 in such position that its plunger 54 will be operated by the bending action of the resilient bar. The instrument is provided with a zero indicating pointer 55, a rotatable dial 56, an indicating or control hand 57, and an adjustable hand 58. The plunger is operatively connected to the control hand 55 and extends downwardly through a hole in the measuring bar until it is seated on the spring bar 51 so that when the central portion of the spring bar is bent upwardly by the jack it will operate the plunger upwardly to move the control hand 57 to the right. The zero pointer 55 is mounted on the rear of the instrument and bent over its casing to point to the position in which the control hand 57 will be when there is no load on the test specimen. This will be the zero point.

Figure 7:
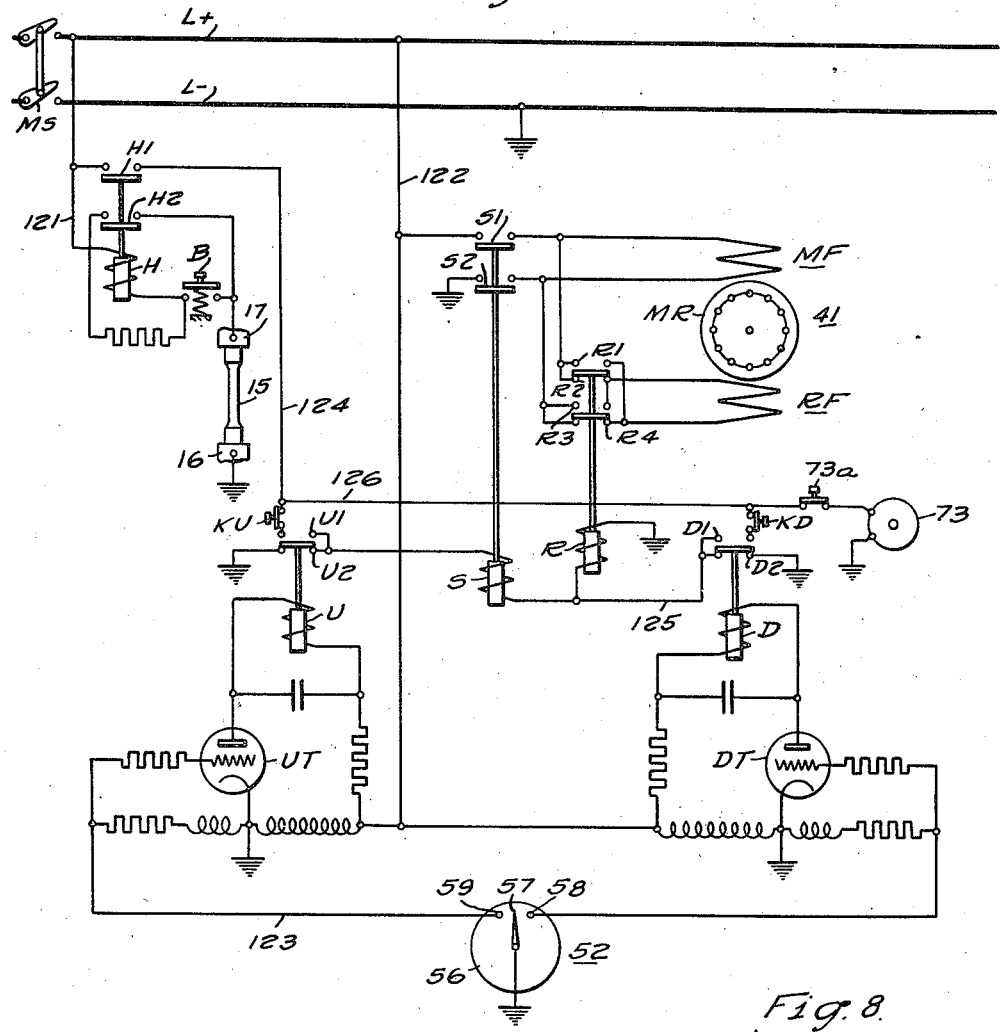
Fig. 7 is a diagrammatic representation of the electrical control system for the testing apparatus.
Figure 6:
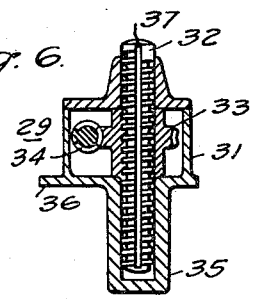
Fig. 6 is a sectional view through a center of the loading jack mounted in the upper part of the testing apparatus shown in Figs. 1 and 2.

In order that the measuring instrument may be used as a switching device for controlling the motor 41 to increase the jack pressure whenever the test specimen elongates sufficiently to decrease the load on it, the rotatable dial 56 is provided with a pressure scale reading up to 4,000 pounds in anticlockwise direction, a contact segment 59 is glued to the dial in position to project into the path of the control hand 57 at its left-hand side and both the contact segment and the control hand are so connected in the control system illustrated in Fig. 7 that they can be used to control the motor 41. For instance, if the dial is at zero and then is turned clockwise until it moves the control hand to a point indicating a load of 2,000 pounds, the motor will start and run the jack up until the load equals 2,000 pounds, when the control hand will move beyond the contact segment and thus stop the motor.

Figure 8:
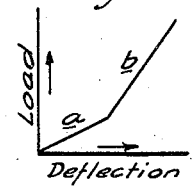
Fig. 8 represents a typical two range curve resulting from my improved measuring bar.

The satisfactory operation of the machine depends on how constant the load presented by the deflection of the spring bar 51 can be maintained. When the specimen elongates, the load drops a small amount, and the load measuring bar must be sensitive enough to respond to a change of load of about 0.1% and also must be rigid enough to withstand the shock when the specimen breaks and suddenly releases the entire load. In addition, it must be sensitive over a wide range of loads. To meet these requirements, I make a second saw cut or slot 50a in the alloy steel bar to produce a second spring bar 51a above the spring bar 51 and construct a small boss 51b on its lower central base such a distance from the first bar 51 that that bar will bear against the boss when it bends under a load of, say, 4,000 pounds and from then on the resistance of the second bar 51a will be added to the resistance of the first bar 51, thus giving a higher spring constant of, say, 16,000 pounds for a movement equal to the movement of the first spring bar in response to a 4,000 pound pressure, thus giving a total range of 20,000 pounds for both bars. Normally the spring bar is so made and the instrument is so selected that the initial bending of the bar up to the point where it engages the boss on the second bar will rotate the control once around the dial and the dial may be marked to read directly on the pressure measured during that rotation. However, when the first spring bar contacts the second spring bar and both become effective, the control hand will be on its second trip around the dial and will indicate a much heavier load by each mark on the dial. Consequently the reading of the dial during the second trip of the hand around it will have to be made with that in mind. A typical load-deflection curve for the two ranges of the measuring bar is indicated in Fig. 8, the range for the first bar 51 alone being indicated by the letter *a* and the range for both bars acting together being indicated by the letter *b*. The use of the two spring bars does not affect the operation of the pen or the counter meter but does change the reading and action of the control hand on the measuring instrument, thus causing the motor to start more often in the low range than in the high range so that the instrument will be very sensitive for low loads and the motor will keep the constant load accurately in the low range of pressure.

The use of the two bars permits the accurate measurement of small loads as well as large loads. The measuring bar need not be limited to two spring bars; that is, two ranges, but accuracy will decrease as the number of bars or ranges increases. Although a sensitive dial gauge is used to indicate the load, no shock is placed on the instrument because the spring bar deflects away from the plunger when the load decreases.

The adjustable hand 58 is also provided with a contact on its outer end in the path of the hand 57 and is pivotally mounted on the front cover of the instrument. A knob 58a is attached to the hand 58 by which it may be moved to any desired position. The hand 58 is so connected in the control system of Fig. 7 that contact of the hands 57 and 58 will cause reversal of the jack motor. At the start of a test, the reversing hand 58 is turned clockwise well away from the control hand. After the dial is adjusted, the reversing hand is turned counterclockwise to a position which represents a load of approximately 1% greater than the load at which the bar is set.

An electric furnace 60 is provided for heating the test specimen to any desired test temperature. The furnace 60 is constructed with a cylindrical outer housing 61 and an inner housing 62 and is provided with heating windings 63 disposed in suitable insulating material adjacent to the inner housing for heating the test specimen. The windings, as is usual for electric furnaces of the type shown, are disposed to be non-inductive.

A thermocouple control device 64 is disposed in the midsection of the furnace and is interconnected with a control device or regulator 65 mounted on the channel iron 11 for maintaining the temperature in the furnace constantly at any selected temperature. The electrical energy for the furnace may be supplied from any suitable source in any suitable manner.

The furnace is slidably mounted on a square rod 66 by means of a pair of brackets 67 and 68, and it may be locked at any height on the rod by means of a tightening nut 69 on the bracket 68. The square rod 66 is rotatably mounted on the front edge of the channel iron 12 by a pair of brackets 70 and 71. As shown by the dotted lines 72 in Fig. 1, the furnace may be dropped down on the rod 66 and swung out to the one side of the testing machine to facilitate the making of any repairs or adjustments.

When the specimen is under test in the furnace it elongates as it creeps with time and this permits the elastic segment of the measuring bar to contract a slight amount. As noted before, this small contraction is used to start the motor to raise the jack until the load on the test specimen is restored thus keeping the load constant. The rise of the jack during a test is the same as the extension of the test specimen. The accuracy of this measurement of elongation depends on the following conditions. Since the load and temperature are held constant, the thermal and elastic deflections of the entire system are fixed. Therefore, the relative motion of the heads of the machine (the movement of the jack) is caused by the plastic flow of the parts of the system which consist primarily of the extension pieces and the specimen. The cross sectional area of the extension pieces in the hot zone of the furnace is over four times that of the gauge length. The creep rate in the extension pieces will be less than 0.01% of that in the gauge length. The heads of the specimen are also made large to reduce the creep. Inasmuch as the extension of the specimen corresponds to its creep, a creep-time curve to rupture can be secured by testing a specimen under constant load and constant temperature until it ruptures and making a curve based on the time consumed by the test and the amount of rise of the jack during the test.

In accordance with my invention, I make use of the joint operation of the jack-operating mechanism and a clock mechanism 73 for operating a recording member such as a pen 74 to automatically produce a continuous creep-time-to-rupture curve for the specimen under test upon a curve sheet supported on a board 75.

The curve sheet board 75 is mounted in a vertical position on the front edge of the top plate 13 by means of suitable brackets 76 and 77 in such position that a curve sheet may be easily mounted on the face thereof by means of small strips of Scotch tape.

The pen 74 is mounted in front of the board and in position to operably bear against the curve sheet thereon by a pen carriage comprising a cross bar 78, a screw threaded drive bar 79 and a pair of end members 80 and 81. The end members 80 and 81 are mounted by means of screw threaded connections on a pair of vertical screw threaded shafts 82 and 83 so that operation of these shafts will move the carriage either up or down according to rotation of the shafts. The shafts are rotatably supported on the rear face of the curve sheet board by means of a plurality of brackets 84, 85, 86 and 87. A gear chain 88 is disposed on a pair of sprocket wheels 89 and 90 on the lower ends of the shafts so that rotation of either shaft will cause similar rotation of the other.

The pen is supported on the carriage by a U-shaped clip 74a which is seated by a screw threaded section on the drive shaft 79. A spring 74b is attached to the clip in such position that its end portions are slidably disposed in a groove 78a in the carriage bar 78 to provide a means for slidably and frictionally positioning the pen mount on its drive shaft. The pen clip 74a may be lifted from the drive shaft and may be replaced on it in its starting position adjacent to the clock mechanism at any time.

The jack mechanism is connected to operate the screw threaded shaft 82 by an auxiliary gear mechanism comprising a gear wheel 92, a shaft 93, a gear wheel 94, a pinion 95, a stub shaft 96, and beveled gears 97 and 98. The shaft 93 is rotatably mounted in the bracket 77 and a bracket 99 on the plate 13. The shaft 96 is rotatably supported in the bracket 84. The gear wheel 92 is mounted on one end of the shaft 93 in position to mesh with the gear wheel 49 on the jack worm shaft and the gear wheel 94 is mounted on the other end of the shaft in position to mesh with the pinion 95 mounted on the inner end of the stub shaft 96.

The beveled gear 97 is disposed on the outer end of the shaft 96 in position to mesh with the beveled gear 98 on the screw threaded shaft 82 so that rotation of the gear wheel 49 in raising the jack will cause rotation of the shaft 82 and thereby move the pen carriage in a vertical direction over the curve sheet. The gear wheels 92, 94 and 95 and the beveled gears 97 and 98 are made of such size that, in conjunction with the worm 34 and the worm wheel 33 of the jack, they mechanically magnify the rise of the jack and thus cause the pen to make a much magnified record of the elongation of the test specimen. For example, the gears may be selected for such magnification so that the pen carriage will move one inch for each one one-hundredth inch of elongation per inch or a strain scale of 1% per inch. Further, the gears 94 and 95 may be readily changed to give other magnifications.

When it it is desired to return the carriage to its lower position for a new test, the set screw holding the pinion 95 is loosened slightly, the pinion is then moved out of contact with the gear wheel 94 and the chain 88 is pulled in reverse direction until the carriage is returned to its lower starting position.

The clock 73 for moving the pen in horizontal direction in accordance with time is electrically driven and is mounted on the carriage member 80 in position to rotate the driving shaft 79 through a worm 100 driven by the clock mechanism and a worm wheel 101 disposed on one end of the drive shaft. The clock is electrically connected in the electrical control circuit of Fig. 7 by a manual switch 73a in such manner that it will start when the control system is started for a creep-time test and will continue in operation until the test is stopped either by the breaking of the test specimen or by disconnecting the control system from its source of energy. The manual switch 73a is provided for disconnecting the clock while making preliminary tests before starting a creep-time-rupture test. The clock may be adjusted to advance the pen at any desired rate. For example, it may be set to cause the pen to travel at a rate of one inch in an hour or at a rate of one inch in twenty hours.

When a specimen is to be tested, it is desirable to take the loading curve while applying the load for the creep-time-rupture test. For example, if a creep-time test is to be made at a constant load of 8,000 pounds, it is desirable to make readings on the rise of the jack at, say, 2,000; 4,000 and 6,000 pounds or some other increments of load. It will not be desirable to start the pen on the curve sheet during the loading. Therefore, I have mounted a counting meter 112 on the upper part of the curve board for indicating the rise of the jack. The meter is operated by a beveled gear 113 fixed on the outer end of the shaft 93 and a beveled gear 114 on the meter so that it will respond to rotation of the shaft 93 and thus give a magnified record of the extension of the jack.

The gearing and the numerals on the meter are so selected that the meter reading will indicate the same distance as that which would be traveled by the pen were it connected for operation. For instance, forty points on the meter may indicate an inch on the curve sheet. The meter makes a continuous record and the tester secures records from it by noting the reading at the start and then at the end of the increment of load; the difference giving the magnified distance for the rise of the jack.

The meter will also serve another purpose in that it will continue the elongation record even if the recording pen moves off the curve sheet in a creep-time-rupture test before the specimen ruptures and from this record the curve drawn on the curve sheet may be extended to give a complete curve for the test.

An automatic means is provided for disconnecting the control system and the clock when the test specimen breaks, by passing a control current through the test specimen. Some test specimens will rupture without making a clean electrical break because small splinters or fragments at the point of rupture will maintain electrical contact sufficiently to maintain the control circuit. In order to avoid difficulties of this nature I have provided a spring 115 for raising the pulling grip 17 upwardly sufficiently to separate the fractured parts of the ruptured test specimen. The spring is flat and is formed with an upwardly bent central portion and is disposed on top of the cross bar 20 and underneath the nut 21. The control circuit is connected by a conductor 116 to a metal washer 117 which rests on a strip of insulation material 118 placed on top of the cross bar.

An insulating tube 119 is disposed on the upper grip to insulate it from the cross bar. When the nut 21 is tightened to hold the test specimen in test position, it forces the spring 115 downwardly into electrical engagement with the washer. When the test specimen breaks, the spring bends upwardly and lifts the upper grip and the nut 21 thus breaking the connection with the washer and thereby opening the control circuit through the test specimen regardless of the condition of the ruptured ends of the specimen. This action plus the forcible separation of the ruptured parts of the specimen ensures disconnection of the auxiliary control circuit to stop the clock and open the main control circuit when the test is completed to rupture.

In the control system illustrated in Fig. 7, a pair of supply conductors L+ and L— are provided for operating the motor and the various control relays associated therewith. The conductor L+ is disposed to be connected to the relays and the motor to constitute one side of the control circuit. The conductor L— as well as the motor and the various relays are indicated, for the sake of simplicity, as being grounded to the frame of the test specimen to provide the return side of the circuit. A main line switch MS is used for connecting the supply conductors to a suitable source of electrical energy and a push button B is disposed in the auxiliary control circuit through the test specimen for starting the system in operation when a test is to be made. When the button B is closed, it energizes a holding relay H to maintain the auxiliary circuit through the test specimen until the specimen ruptures and stops the test.

The motor is provided with a rotor MR, a main field winding MF disposed to be connected to the supply conductors by a starting relay S, and a reversing field winding RF disposed to be controlled by a reversing relay R. An up direction relay U and a down direction relay D are provided for controlling the starting and reversing relays. Inasmuch as the contacts on the hands of the switching instrument 52 are necessarily so small as to be able to carry only a small current, they are connected to control an up direction amplifying tube UT and a down direction amplifying tube DT for causing energization of the up direction relay U when the jack is to be raised and for causing energization of the down direction relay D when the jack is to be lowered. In order to stop the motor temporarily during a test, an up manual switch KU and a down manual switch KD are included in the control circuits.

*Assumed operation*

It will be assumed that a test specimen of 0.505 inch diameter will be given a creep-time to rupture test at a constant temperature and at a constant load of, say, 8,000 pounds. While applying the full load, it is advisable to make a series of loading readings, say, at 2,000 pounds, 4,000 pounds and 6,000 pounds to detect any plastic flow which may occur during the application of the load.

To prepare the machine for loading, it will be assumed that the clock switch 73a is opened to prevent operation of the clock mechanism until the creep-time test at constant load is started; that the pen carriage is in its lowermost position and adjacent to the clock mechanism; that the pinion 95 has been moved out of engagement with the gear wheel 94; that a curve sheet has been placed on the curve board; that the reading of the meter 112 has been noted on the curve sheet; that the dial 56 has its zero point disposed at the zero pointer 55 with the control hand against the contact 59 on the dial; that the reversing hand 58 is moved clockwise well away from the control hand; and that the furnace 60 is in its lower position.

It will be assumed now that the test specimen is inserted in the machine by screwing its lower end into the upper end of the anchor grip 16 and by screwing the upper grip 17 to the upper end of the specimen and then putting on the nut 21. The turnbuckle is now tightened to take up any lost motion in the assembly and hold the specimen firmly in test position. The furnace 60 is now raised to its normal position around the test specimen and connected to its source of electrical energy (not shown) and the furnace controller 65 is set to hold the furnace at the desired constant temperature. After the furnace heats up the specimen, the nut 21 is tightened to apply a small initial load. The dial 56 on the measuring instrument is now turned clockwise until its 2,000 pound point is at the zero pointer 55. This clockwise rotation of the dial causes the projecting contact 59 to carry the control hand 57 along with it to its 2,000 pound position.

The loading will now be started by closing the push button B, thus energizing the relay H by a circuit extending from supply conductor L+ through conductor 121, the coil of relay H, the contacts of button B, the test specimen 15, and through its grounding on the frame to the supply conductor L−. The energized relay H closes its contacts H1 and H2. The closed contacts H2 complete a holding circuit for the relay H so that the starting circuit will remain in action after the push button B is released.

The closing of the contacts H1 energizes the up direction amplifying tube UT by a circuit extending from conductor L+, through conductor 122, tube UT, conductor 123, contacts 59 and 57 of the instrument 52 and ground to conductor L−. The energized tube UT causes sufficient current to flow to the up direction relay U to energize it, thus opening its contacts U2 and closing its contacts U1. The closing of the contacts U1 energizes the starting relay S by the circuit L+, 121, H1, 124, KU, U1, S, 125, D2 and ground to L−. The energized relay S closes its contacts S1 and S2 thereby energizing the main field winding MF. Inasmuch as the relay R is not energized at this time, its contacts R2 and R4 remain closed so that the reversing field winding RF is energized for operating the jack in the up direction. The energization of the field windings MF and RF starts the motor to operate the jack for the purpose of loading the specimen up to 2,000 pounds.

The operation of the motor causes corresponding operation of the pulley 43, belt 44, pulley 45, shaft 46, reducing gears 47, pinion 48, gear 49, worm 34 and worm wheel 33 to move the jack shaft 32 upwardly. The upward movement of the jack shaft applies force to the spring bar 51 and thus loads the specimen through the medium of the measuring bar 25, the vertical rods 22 and 23, the cross bar 20 and the upper grip 17. The spring bar 51 bends upwardly under the loading action of the jack, and when the load reaches the 2,000 pound setting, the bar 51 operates the plunger 54 upwardly to move the hand 55 away from the contact 59, thus breaking the circuit for the amplifying tube UT, whereupon it ceases firing and thus deenergizes the up direction relay U to open its contacts U1. The opening of the contacts U1 deenergizes the motor 41 thus stopping it. The desired increment of the load is now on the test specimen and the tester reads the counting meter 112 and enters that reading on his chart of the test.

Immediately, the next increment of load of 2,000 pounds is applied to the specimen by rotating the dial 56 further in clockwise direction until its 4,000 pound marking comes opposite the zero pointer 55. This clockwise rotation of the dial 56 from its 2,000 pound position to its 4,000 pound position causes the contact 59 to engage the control hand 57 and carry it along. The engagement of the contact 59 with the hand 57 closes the circuit to the up direction amplifying tube UT, thus energizing it as before described to again start the motor to raise the jack sufficiently to increase the load to 4,000 pounds. As this action is completed, the bending of the spring bar 51 by reason of the addition to the load causes the plunger 54 to move the control hand away from the contact segment 59 and thus open the circuit for the tube UT which in turn deenergizes the up direction relay U and thus stops the motor. Again the tester reads the counting meter 112 and enters the reading on his chart.

A third increment of load of 2,000 pounds is applied immediately by moving the dial clockwise until its point for 6,000 is opposite the zero pointer. It should be remembered that the first spring 51 is now in engagement with the second spring 51a and the measuring bar is entering its second range where the hand will correspond to a pressure of 2,000 pounds instead of 4,000 pounds. With this understanding, it will be seen that the dial need be moved only one-fourth the distance heretofore moved in increasing the load by 2,000 pounds.

As the dial is moved to a position corresponding to 6,000 pounds, it causes the contact 59 to engage the hand 57 and carry it with it. The engagement of the contact and the hand again energizes the motor as previously described to raise the jack and thereby increase the jack pressure to the desired 6,000 pound load. As the jack rises, the two spring bars bend upwardly until at the 6,000 pound point the hand 57 is moved away from the contact 59, thus opening the circuit for the relay UT and thereby stopping the motor at this point. The tester now notes the reading of the counting meter on the curve sheet.

Immediately, the next and final increment of load of 2,000 pounds is applied to the specimen by rotating the dial 56 further in clockwise direction until its 8,000 pound marking is opposite the zero pointer 55. This movement causes the contact 59 to engage the hand 57 and move it from its 6,000 pound position to its 8,000 pound position. The engagement of the contact and the hand starts the motor as before described and it operates the jack to raise the load on the specimen to 8,000 pounds, when the further bending of the spring bars 51 and 51a moves the plunger 54 to separate the contact 59 and hand 57 and thus stop the motor with the load standing at 8,000 pounds. The attendant now reads the meter and notes the reading on the curve sheet.

The loading readings are now completed and the machine is prepared for making the desired creep-rupture test of the specimen at the 8,000 pounds constant load. To do this, it will be assumed that pinion 95 is moved into mesh with the gear wheel 94 and tightened it on its shaft 96 to connect the jack gear mechanism with the pen carriage so that the carriage will move the pen vertically in proportion to the elongation of the test specimen; that the switch 73a is closed to start the clock; that the switch KU is closed, thus enabling the motor to run when the hand 57 is engaged by the contact 59 if the load drops; and that the hand 58 is moved counterclockwise until it is in a position which represents a load of approximately 1% greater than the 8,000 pound load at which the test is to be made.

As time passes, the clock mechanism 73 moves the pen horizontally on the curve sheet. It will be assumed now that the specimen elongates a small amount, thereby permitting the cross bar 20 to move upwardly a short distance and with it the rods 22 and 23, thus decreasing the bend in the loading bars 51 and 51a and permitting the plunger 54 to follow the bar 51 downwardly. This action of the plunger moves the control hand 57 to the left toward the contact 59. As the hand and the contact engage, the tube UT is again energized to start the motor to raise the jack until the 8,000 pound load is restored to the specimen, and the consequent bending of the bending bars 51 and 51a causes the hand 57 to move away from the contact 59 and thus again open the circuit for the tube UT to stop the motor with the load restored on the specimen.

The elongation of the specimen necessary to start the motor to restore the load is very small, but the test instrument and the spring bars 51 and 51a are sensitive and will operate to restart the motor approximately as soon as the load is decreased a very small amount by a minute elongation of the specimen so that the load on the specimen will be kept at approximately the predetermined constant value selected for it.

The operation of the gear train in raising the jack to restore the load on the specimen also moves the pen carriage upwardly a distance corresponding to the elongation of the test specimen but mechanically multiplied many times in proportion thereto. This is effected by the operation of the worm wheel 33, the worm 34, shaft 40 and gear wheel 49 because the gear wheel 49 rotates the gear wheel 92, the shaft 93, the beveled gears 94 and 96 and the vertical shafts 82 and 83 to move the pen carriage upwardly. Hence when the jack is raised by the motor in response to an elongation of the specimen until the load is restored on the specimen, it moves the pen carriage upwardly in accordance with the elongation of the specimen but a distance multiplied many times in proportion thereto by the magnifying gear ratio.

The apparatus will be left in its present condition and every time the specimen elongates under the load, the spring bars 51 and 51a will move the hand 57 counterclockwise to start the motor, as described. As the load is restored, the hand 57 moves clockwise and stops the motor. Meanwhile, the raising of the jack in restoring the load moves the pen carriage. This load-restoring action will be repeated many times during the progress of the test.

When the clock was started at the beginning of the test, it rotated its worm 100 to rotate the worm wheel 101 and by it the drive shaft 79. The operation of the drive shaft 79 moves the pen 74 in a horizontal direction over the curve sheet on the curve board. Inasmuch as the pen is moved upwardly in accordance with the strain of the test specimen and horizontally in accordance with the passage of time, it will draw a curve on the curve sheet giving a creep-time curve.

It will be assumed now that, in restoring the load to the predetermined constant value, the motor over-runs in raising the jack. When the jack rises higher than it should in restoring the load, the upward bending of the spring bars 51 and 51a moves the control hand clockwise into contact with the reversing hand 58. The contact of the hands 57 and 58 energizes the amplifying tube DT by the circuit, L+, 122, DT, 58, 57 to ground. The energized tube DT causes energization of the down direction relay D to close its contacts D1 and open its contacts D2. The closing of the contacts D1 energizes the reversing relay R by the circuit L+, H1, 124, 126, KD, D1, R to ground and also energizes the starting relay S by the circuit L+, 121, H1, 124, 126, D1, S, U2 to ground. The energized reversing relay R opens its contacts R2 and R4 and closes its contacts R1 and R3 to cause reverse operation of the motor. The energized relay S closes its contacts S1 and S2 thus energizing the motor and it starts in reverse operation and thereby operates the belt 44 and the gearing 47, 49, etc., to lower the jack, thus causing the control hand to move counterclockwise away from the reversing hand. As the control hand 57 leaves the reversing hand 58, it opens the circuit through the tube DT and thus stops the motor.

It will be assumed now that the specimen has been under test for a long time and that it finally ruptures. The rupture of the test specimen opens the auxiliary control circuit through the coil of the relay H which upon being deenergized opens its contacts H1 and H2 thereby deenergizing the clock 73 to stop its further action and also deenergizing the relay S which opens its contacts S1 and S2 thus deenergizing the motor 41 to prevent its further operation. It should be noted that when the test specimen ruptures, the spring 115 raises the nut 21 off the washer 117 and thus completely breaks the auxiliary control circuit even though any slivers on the ruptured test specimen may be making an electrical contact.

After the test is completed and the test specimen removed, the jack may be returned to a lower position by closing the push button switch B and moving the hand 57 of the instrument 52 into engagement with the hand 58 to thereby energize the down direction amplifying tube DT and thus the down direction switch D to reverse the motor 41 and start it in the down direction. The motor may be stopped by opening the main line switch MS or the switch KD. The motor need not be used to return the jack to a lower position as it may be lowered by loosening gears 92 and 48 and rotating the gear wheel 49 by hand until the jack is in the desired position.

By the foregoing arrangement of the apparatus, it will be seen that I have provided a simple and inexpensive machine for producing a creep curve to rupture. It will also be seen that the machine is simple in construction, accurate in operation and one which will require practically no attention from the time it is started until possibly several days later when the test is completed. It will also be understood that the means for so regulating the motor on the jack that the force measuring bar is extended a constant amount not only keeps the load constant through the test but serves as a means for operating the simple recording mechanism of this machine and thereby eliminates sources of error in recording the amount of creep of the specimen.

Although I have illustrated and described only one specific embodiment of my invention, it is to be understood that changes therein and modifications thereof may be made without departing from the spirit and scope of the invention.

I claim as my invention:

1. In a machine for testing a specimen of material, a frame, a specimen deforming device mounted on the frame, means for attaching one end of the specimen to the frame, a resilient means connecting the other end of the specimen to the deforming device, a motor for operating the deforming device to load the specimen, means responsive to operation of the resilient means when the specimen is loaded for controlling the motor to maintain the load on the specimen at an approximately constant value, a clock mechanism, and means responsive to operation of the deforming means and to operation of the clock mechanism for producing a creep-time curve for the specimen.

2. In a machine for testing a specimen of material, a frame, a deforming device mounted on the frame, means for connecting one end of the specimen to the frame, means for connecting the other end of the specimen to the deforming device, said second mentioned connecting means including a measuring bar having a first spring section for low deforming loads and a second spring section disposed to be engaged by and be deflected by the first spring section when the deforming load exceeds a predetermined value, and a measuring instrument responsive to deflection of the first spring section for giving a two-range reading on the deforming load on the specimen.

3. In a machine for testing a specimen of material, a frame, a deforming device mounted on the frame, a motor for operating the deforming device to load the specimen, means for connecting one end of the specimen to the frame, resilient means for connecting the other end of the specimen to the deforming device, means responsive to the action of the resilient means when the specimen is loaded for controlling the motor to maintain the load on the specimen at a predetermined value, and a recording means responsive to operation of the deforming device for recording an indication proportional to the movement of the deforming device and therefore proportional to the elongation of the specimen.

4. In a machine for determining the plastic flow, or creep, of materials, a frame, a jack mounted on the frame, means for connecting one end of a test piece to the frame, a resilient means for connecting the other end of the test piece to the free end of the jack for a test, a furnace for keeping the test piece at a constant temperature, a motive means, means operable by the motive means for operating the jack to load the test piece, means responsive to operation of the resilient means during a test for controlling the motor to maintain the load on the test piece at a predetermined value, a clock mechanism, and means responsive to operation of the clock mechanism and to operation of the jack during a test for producing a creep-time curve for the test piece.

5. In a machine for testing a specimen of material, a frame, a furnace for maintaining the specimen at a constant temperature, a loading means comprising a jack mounted on the frame, means for fastening one end of the specimen to the frame, a resilient means for fastening the other end of the specimen to the jack, a motive means for operating the jack to load the specimen, a control means responsive to action of the resilient means upon elongation of the specimen for causing the motive means to maintain the load on the specimen at a constant value, a clock mechanism, a recording means responsive to operation of the clock mechanism and to operation of the loading means in maintaining a constant load on the specimen for producing a creep-time curve, a control circuit connected through the specimen for maintaining the machine in testing operation, and means responsive to rupture of the specimen for moving one of its ruptured parts away from its other part.

6. In a machine for determining the plastic flow, or creep, of materials, a frame, a measuring bar having an elastic segment, means for connecting one end of a test piece to the frame and its other end to the ends of the measuring bar, a furnace for keeping the test piece at a constant temperature, a jack mounted on the frame in position to engage the elastic segment, a motor, means for connecting and disconnecting the motor with a source of energy for a test operation, a main gear mechanism connected with the jack and operable by the motor for operating the jack to load the test piece, a switching instrument mounted on the measuring bar and responsive to movement of the elastic segment in response to elongation of the test piece for controlling the motor to maintain a predetermined load on the test piece, a pen for tracing a curve on a curve sheet, an auxiliary gear responsive to operation of the main gear mechanism for moving the pen in one direction in magnified proportion to movement of the jack in maintaining the load on the test piece, and a clock mechanism for moving the pen in another direction during the test, whereby the pen is caused to trace a creep-time curve for the test piece.

7. In a machine for determining the plastic flow, or creep, of materials, a frame, a jack mounted on the frame, means for connecting one end of a test piece to the frame, a resilient means for connecting the other end of the test piece to the jack, a furnace for maintaining the test piece at a constant temperature, a motor, means for connecting the motor to a source of electrical energy when starting a test and for disconnecting it at the end of a test, a main gear mechanism connected with the jack and operable by the motor for operating the jack to load the test piece, a switching instrument responsive to action of the resilient means during a test for controlling the motor to maintain the load on the test piece at a predetermined value during test, a clock mechanism, and a recording means responsive to operation of the clock mechanism and to operation of the jack in maintaining the load on the test piece for tracing a creep-time curve for the test piece.

8. In a machine for determining the plastic flow, or creep, of materials, a frame, a measuring bar having an elastic segment, means for connecting one end of a test piece to the frame and its other end to the measuring bar, a furnace for keeping the test piece at a constant temperature, a jack mounted on the frame in position to engage the elastic segment, a motor, means for connecting and disconnecting the motor to a source of energy for a test operation, a gear mechanism connected with the motor for operating the jack to load the test piece, a switching instrument responsive to movement of the elastic segment for controlling the motor to maintain the load on the test piece at a predetermined value, a pen for tracing a curve on a curve sheet, an auxiliary gear means responsive to operation of the main gear mechanism in raising the jack for moving the pen in one direction in magnified proportion to the elongation of the test piece, a clock mechanism for moving the pen in another direction during the test, whereby the pen is caused to trace a creep-time curve for the test piece, and a recording device responsive to operation of the auxiliary gear for recording the distance the jack rises to provide data for use in making a loading curve and for extending the curve when the pen is moved beyond the curve sheet before a test is completed.

9. In a machine for determining the plastic flow, or creep, of materials, a frame, a measuring bar having a first spring bar and a second spring bar disposed to be engaged by the first spring bar at a predetermined load, means for connecting one end of a test piece to the main frame and its other end to the measuring bar, a furnace for keeping the test piece at a constant temperature, a jack mounted on the main frame in position to engage the first spring bar, a motor, a control system for connecting the motor to a source of energy for a test of the test piece, a main gear mechanism connected with the jack and operable by the motor for operating the jack to load the test piece, a switching instrument mounted on the measuring bar and responsive to movement of the first spring bar in response to elongation of the test piece for controlling the motor to maintain a predetermined load on the test piece, a holding device for a curve sheet, a pen for tracing a curve on the curve sheet, an auxiliary gear responsive to operation of the main gear mechanism for moving the pen in one direction in magnified proportion to the movement of the jack in loading the test piece, a clock mechanism for moving the pen in another direction during the test, whereby the pen is caused to trace a creep-time curve for the test piece, a recording device responsive to operation of the auxiliary gear for recording the distance the jack moves in maintaining the loading on the test piece to provide data for use in a loading curve and for extending the curve when the pen is moved beyond the curved sheet before the test is completed, and means responsive to rupture of the test piece for stopping the clock mechanism and the motor.

10. A measuring device for a testing machine comprising a bar having two parallel longitudinal slots through its central portion to form an inner spring and an outer spring with a boss disposed on the central portion of one of the springs adjacent to the other spring a predetermined distance therefrom and a measuring instrument mounted on the bar with its plunger movably disposed through the central portion of the bar and the inner spring into contact with the outer spring, whereby an initial force applied to the outer spring will operate the plunger to give one range of measurement and an increased force sufficient to move the outer spring into contact with the inner spring will operate the plunger to give a second range of measurement.

MICHAEL J. MANJOINE.

REFERENCES CITED

The following references are of record in the file of this patent:

UNITED STATES PATENTS

| Number | Name | Date |
|---|---|---|
| 2,154,280 | Nadai et al. | Apr. 11, 1939 |
| 2,185,971 | Achtel et al. | Jan. 2, 1940 |
| 2,353,999 | Counts | July 18, 1944 |
| 269,941 | Johannsen | Jan. 2, 1883 |
| 2,014,357 | Klemperer | Sept. 10, 1935 |
| 2,075,968 | Von Hydekampf | Apr. 18, 1944 |
| 2,351,572 | Kingston | June 13, 1944 |
| 2,346,981 | Manjoine et al. | Apr. 18, 1944 |
| 2,243,413 | Buckingham | May 27, 1941 |
| 2,350,722 | Buckingham | June 6, 1944 |

FOREIGN PATENTS

| Number | Country | Date |
|---|---|---|
| 6,476 | Great Britain | 1903 |